United States Patent [19]

Von Holdt

[11] 4,380,422
[45] Apr. 19, 1983

[54] LONGITUDINALLY EXPANSIBLE AND CONTRACTIBLE HYDROSTATIC MOLD GATE

[76] Inventor: John W. Von Holdt, 7430 N. Croname Rd., Niles, Ill. 60648

[21] Appl. No.: 270,973

[22] Filed: Jun. 5, 1981

[51] Int. Cl.³ .............................................. B29F 1/05
[52] U.S. Cl. .................................. 425/146; 425/562; 425/566
[58] Field of Search ................ 425/146, 564, 566, 562

[56] References Cited

U.S. PATENT DOCUMENTS

| | | | |
|---|---|---|---|
| 3,010,156 | 11/1961 | Smith | 425/146 |
| 3,164,863 | 1/1965 | Hunt | 425/146 X |
| 3,344,477 | 10/1967 | Stokis | 425/564 X |
| 4,289,468 | 9/1981 | von Holdt | 425/566 X |

*Primary Examiner*—Thomas P. Pavelko
*Attorney, Agent, or Firm*—Charles F. Pigott, Jr.

[57] ABSTRACT

A gate for a mold comprises a plunger member mounted in the molding compound inlet conduit and adapted to prevent flow through the conduit in a first longitudinal position and to permit flow through the conduit in second longitudinal positions. The plunger defines an enlarged sealing end which is proportioned to prevent flow through the conduit on the first position. The sealing end defines a mold cavity-facing surface which is of larger cross-sectional area than the surface of the plunger opposed to the mold chamber and subject to contact with pressurized molding compound in the compound. The plunger member is longitudinally expansible and contractible so that even though one end may be rigidly mounted in the conduit, the enlarged sealing end is longitudinally movable to open and close the mold gate in a manner purely responsive to pressures therein. Thus, spontaneous gating of a mold may be provided. The expansible and contractible plunger member may be sealed to prevent seepage of molding compound into its interior.

15 Claims, 4 Drawing Figures

LONGITUDINALLY EXPANSIBLE AND CONTRACTIBLE HYDROSTATIC MOLD GATE

BACKGROUND OF THE INVENTION

In my co-pending application Ser. No. 033,905, filed Apr. 27, 1979 and entitled "Hydrostatic Mold Gate", a mold gate is disclosed which includes a plunger member having an enlarged head slidably mounted adjacent the molding compound inlet conduit. The enlarged head opens and closes the gate responsive to pressure conditions therein. It opens on pressures encountered in the molding inlet conduit to let molding compound into the mold cavity. Then, when the mold cavity is filled and the back pressure increases, the mold gate closes because its mold-cavity facing surface is of larger cross-sectional area than the surface of the plunger opposed to the mold cavity and subject to contact with pressurized molding compound in the conduit.

This surprising result is accomplished because the plunger member has a shaft fitting within a receptacle or sleeve in a manner which is substantially separated from contact with the pressurized molding compound. Accordingly, unbalanced force relationships exist when the elevated pressures on the enlarged head of the plunger from the molding compound inlet and the back pressure from the mold cavity are approximately equal, causing the valve to close.

As described in the cited application, the use of such a hydrostatically operated valve provides significant advantages. For one, it avoids the need for computeroperated adjustment of the gates of a multiple cavity mold which senses in a feedback loop the pressure and temperatures at the control gates, and opens and closes them accordingly. However, for many purposes such a system has been found to have insufficient sensitivity, while the valve gate system of the cited application is directly responsive to the actual pressures themselves, and operates spontaneously without the need for exterior controls. Thus a multiple cavity mold may be provided in which each gate shuts off spontaneously when the mold cavity has been filled, greatly simplifying the requirements for balancing the flow characteristics of a multiple cavity mold.

Other significant advantages are also provided by the hydrostatic type gate of the cited application. For example, it greatly reduces or eliminates the problem of gate freeze, and at the same time provides a gate of larger cross-sectional area to reduce the undesirable effects of material shear and gate stresses, which can actually degrade or decompose molding material due to the kinetic forces applied on the material as it is forced through the gate.

Other problems which can be solved by the hydrostatic mold gate of the cited application relate to the reduction of material suck-back through a gate that stays open too long, or gate drool.

Furthermore, gates of the type described in the cited application can spontaneously reopen during the molding cycle if for any reason the pressure equalization between the cavity and the inlet conduit is merely transient, for example due to shrinkage in the mold or the need for "packing out" the mold. Then, when the pressure in the mold cavity rises again to a predetermined pressure relative to the pressure in the mold cavity, the hydrostatic gate spontaneously recloses again, resulting in a well-finished mold product of high quality and great reproducibility. The valves provide particular advantage in multiple cavity molds since less attention has to be given to balancing the flow characteristics of each cavity in such a mold, because each hydrostatic gate spontaneously shuts each cavity off when the desired pressure conditions have been achieved. Thus, assurance is provided that each cavity in the mold has been properly filled.

By the improvement of this invention, an improved hydrostatic mold gate is provided which is free of sliding parts. In a structure dependent upon the operation of sliding surfaces which operate in contact with hot, pressurized molding compound, it is difficult to seal the sliding surfaces so that molding compound does not seep into the area between the plunger and a receptacle in which it slides. Any molding compound that does seep into that area can interfere with the free sliding of the mold gate, requiring cleaning and repair of the gate.

By this invention, a mold gate of the hydrostatic type is provided in which there are no sliding surfaces available to be interfered with by seeping molding compound. Accordingly, the valve gate operates without the need of maintenance for a greatly increased length of time, while still providing the advantages described above for a hydrostatic type of mold gate.

DESCRIPTION OF THE INVENTION

In accordance with this invention a gate for a mold is provided which comprises a molding compound inlet conduit defining an outer end for communication with a source of molding compound, and an inner end for communication with a mold cavity. A plunger member is mounted in the moulding compound inlet conduit, and is adapted to prevent flow through the conduit in a first longitudinal position and to permit flow through the conduit in a second longitudinal position.

The plunger defines a transversely enlarged sealing end proportioned to prevent the flow through the conduit in the first position. The sealing end defines a mold cavity-facing surface which is of larger cross-sectional area than the surface of the plunger opposed to the mold cavity and subject to contact with pressurized molding compound in the conduit.

The plunger member utilized herein is longitudinally expansible and contractible. Preferably, this longitudinally expansible and contractible characteristic is provided to the plunger member by means which avoid any sliding surfaces into which molding compound can seep. For example, the plunger member may comprise a sealed tubular metal wall, and at least a portion of the tubular wall may define one or more annular convolutions to provide the longitudinally expansible and contractible characteristic. The ends of the plunger member may be sealed with tight, hermetic seals. Thus the enlarged end of the plunger can move longitudinally back and forth by deflection of the annular convolutions, so that the plunger is free of sliding surfaces which can be clogged with molding compound.

Accordingly, the mold gate of this invention provides long term, reliable operation in which pressurized molding compound in the conduit can cause the enlarged sealing end of the plunger member to spontaneously advance to open into a second longitudinal position by the action of pressure on the surface of the enlarged sealing end which is opposed to the mold cavity, when the pressure in the mold cavity is low. However, as pressure in the mold cavity then rises toward relative equalization with the inlet conduit, the enlarged sealing end is forced to longitudinally contract, to spontaneously close to its first longitudinal position, thus closing the mold gate.

It is to be understood that the pressure relationships which operate the mold gate of this invention do not necessarily require equality of the elevated pressures in the mold cavity and the inlet conduit to cause the gate to close. The mold cavity pressure which closes the mold gate may be less than the pressure in the molding compound inlet conduit, depending upon the specific configuration of the mold gate. The use of the unbalanced force principle means that the mold gate can be designed to shut off or close at any of a variety of relative pressure differentials between the mold cavity and the molding compound inlet conduit, depending on the relative areas of the plunger surface facing the mold cavity and the surface opposed to the mold cavity.

It is also desirable for the plunger member to carry within its tubular wall means for limiting the longitudinal contraction thereof to a predetermined minimum length. Thus the plunger member of the mold gate cannot be pushed rearwardly by pressure in the mold cavity beyond a predetermined point, thus preventing reopening of the gate which could cause molding compound suck-back into the molding compound inlet conduit when the molding compound pressure is shut off. This can be accomplished by means of a rod member carried on the inner face of the transversely enlarged sealing end within the tubular wall. The end of the tubular wall opposed to the enlarged sealing end may also be closed. As the result of this, contraction of the plunger member is limited by the impingement of the rod member against the opposed end. Thus the maximum extent of contraction of the plunger member becomes a function of the length of the rod and is predetermined.

It may also be desirable for a projection to be carried on the rod member at a distance farther from the transversely enlarged sealing end than the convolution means utilized herein, and proportioned to impinge the convolution means at a predetermined distance of plunger expansion. Accordingly, the maximum distance which the plunger member can expand may be controlled as well.

Figure 1:
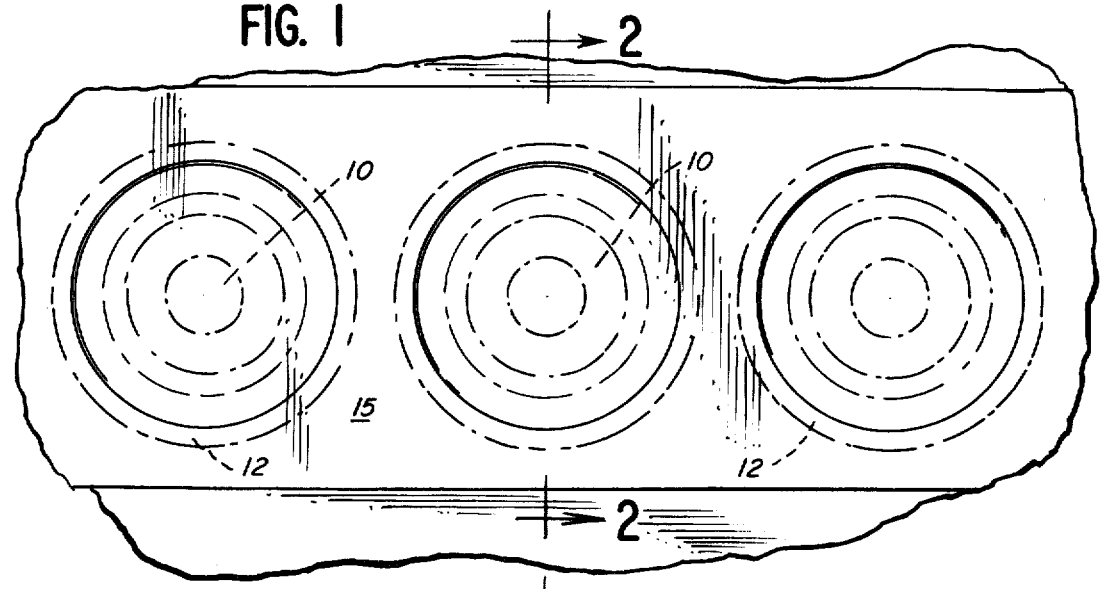
FIG. 1 is a fragmentary plan view of a multiple cavity mold system utilizing the mold gates of this invention.
Figure 2:
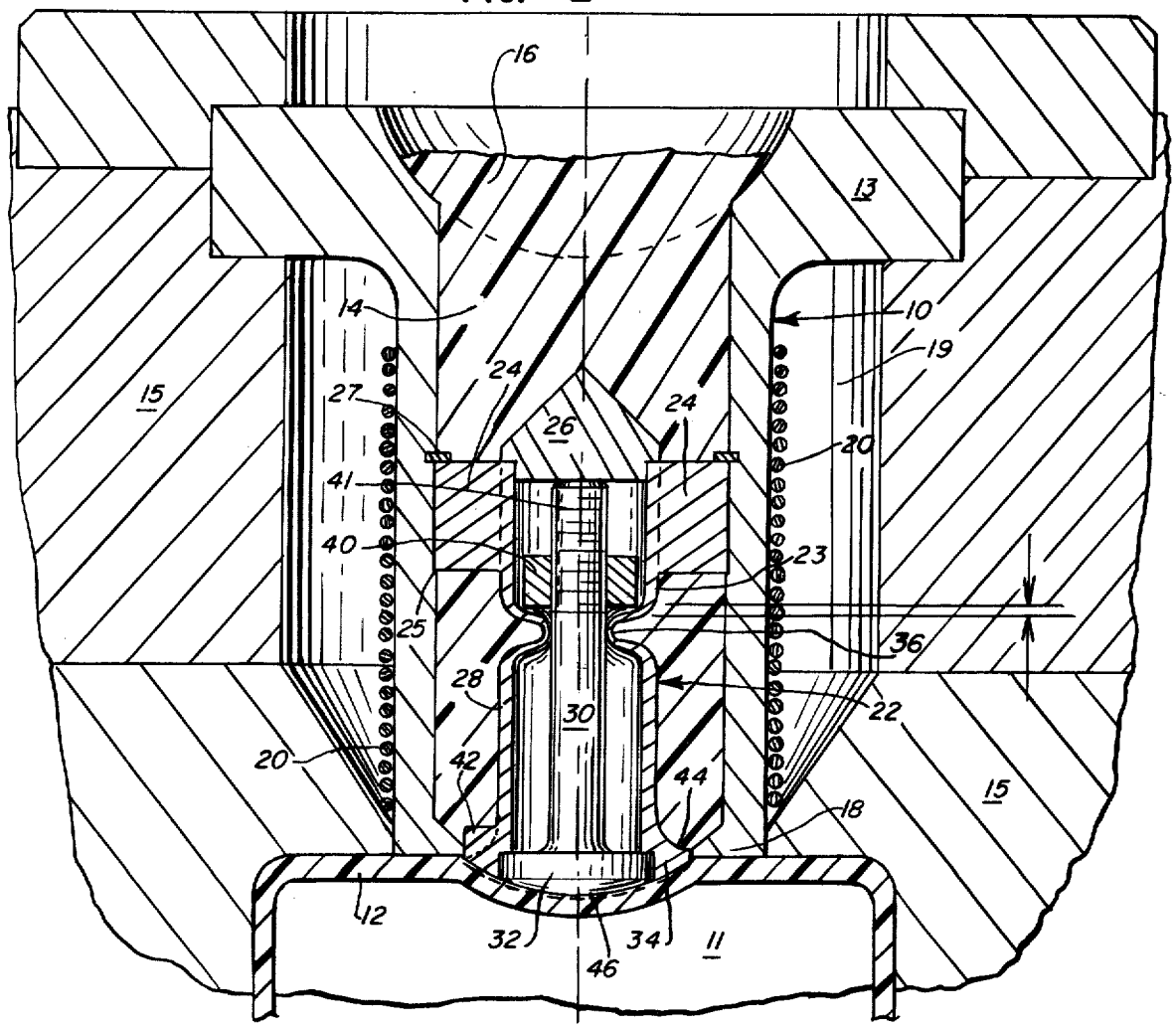
FIG. 2 is a longitudinal sectional view of a closed mold gate in accordance with this invention, taken along line 2—2 of FIG. 1, shown to be installed in conventional injection molding apparatus.
Figure 3:
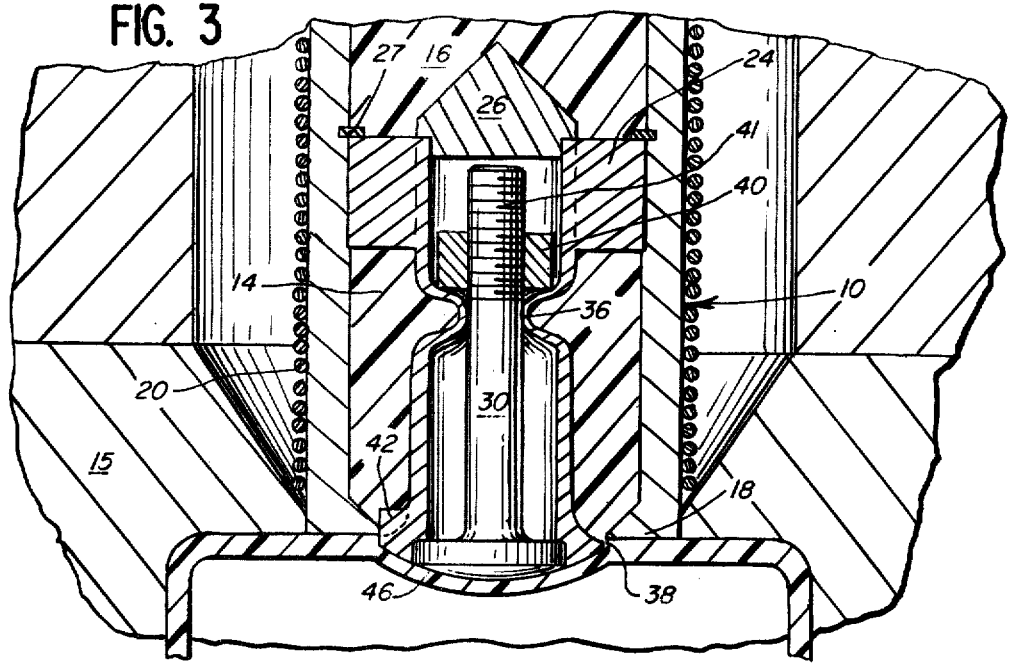
FIG. 3 is a sectional view similar to FIG. 2 showing the mold gate in open position.

Referring to FIGS. 1 to 3, a mold gate 10 is shown installed in a conventional multiple cavity injection mold system for molding a bucket or a cap in a mold cavity 12. Each mold cavity 12 is defined by mold core 11 and outer mold half 15, which are conventionally adapted to move together to define the mold cavities 12, and then to be pulled apart to permit removal of the molded bucket or other structure from each cavity 12.

Mold gate 10 defines an outer housing 13 positioned in aperture 19 of outer mold half 15. Gate 10 defines at least part of the molding compound inlet conduit 14 with an outer end 16 for communication with the source of molding compound in conventional manner and an inner end 18 for communication with mold cavity 12. Heating coils 20 may be provided if desired in any conventional manner to maintain the temperature of the molding compound.

Positioned within outer housing 13, and in the molding compound inlet conduit 14, is a plunger member 22 mounted on the inner surface of housing 13 within the inlet conduit 14 by a series of radially extending vanes 24 positioned, for example, 120° apart about the plunger member 22. Thus the upper portion 23 of plunger member 22 adjacent to vanes 24 is rigidly mounted within inlet conduit 14. Vanes 24 may be secured in annular ledge 25, defined in the inner surface of housing 13, being secured in place by snap ring 27 to rigidly secure the upper end of plunger member 22 in position.

The outer end of plunger member 22 is closed with a seal member 26, which may be tapered in conical form as shown to provide streamlined, downward flow for the molding compound within inlet conduit 14. As shown, plunger member 22 comprises a sealed tubular metal wall 28 which surrounds rod member 30. Rod member 30 defines at its inner or lower end an enlarged head 32. Head 32 is sealed to enlarged sealing end portion 34 of metal tube 28, to collectively define a sealed, transversely enlarged sealing end which is proportioned to seal the aperture defined in the inner end 18 of housing 13 when in the longitudinal position shown in FIG. 2.

Metal tubing 28 defines one or more annular, inwardly extending convolutions 36 which permit the lower portion of plunger member 22 to be longitudinally expansible and contractible, so that transversely enlarged sealing end 32,34 seals the opening at end 18 of housing 13 in a first position as in FIG. 2, and extends into mold cavity 12 in a second position as in FIG. 3, to provide an annular gate opening 38 through which pressurized molding compound can pass. The wall thickness of tube 28 may be reduced at convolutions 36, as shown.

Rod member 30 also carries a projection 40 which may be an annular sleeve as shown. Projection 40 may be a threaded nut mounted on threads 41 of rod 30 to be adjustably positionable. Rod member 30 may also be of a width as shown that prevents collapse of convolutions 36 in the presence of highly pressurized molding compound in inlet conduit 14 by supporting them at their inner ends.

A series of radially mounted strengthening ribs 42, for example positioned 120° apart, may be provided to strengthen the enlarged sealing end defined by members 32, 34, and also to serve as a guide as plunger member expands and contracts in sliding relation with the aperture at the end 18 of housing 13.

Accordingly, as pressurized molding compound enters the molding compound inlet conduit, it flows around plunger member 22, but is incapable of entering into the hollow bore of tubing 28, which is typically sealed at both ends. As the pressurized molding compound exerts its pressure against the rear face 44 of the enlarged end 34, it drives enlarged end 32, 34 forward to expand plunger member 22 from the configuration of FIG. 2 to that of FIG. 3, opening substantially annular mold gate opening 38 so that the molding compound can flow into mold cavity 12.

As the molding compound then flows in the mold cavity 12, the back pressure in the mold cavity rises to typically approximate the pressure in the molding compound inlet conduit. When this takes place, an unbalanced force relationship causes plunger member 22 to contract once again to the position of FIG. 2, because the mold cavity-facing surface area 46 of the enlarged end defined by members 32, 34 is substantially greater than the surface area 44, in contact with the pressurized molding compound, which faces away from the mold cavity. Thus the force tending to urge the plunger member to expand into its second position is overbalanced by the force urging the plunger member to contract back to its first position. Hence the mold gate closes.

In the event that the back pressure in mold cavity 12 should decrease for any reason, for example due to further packing of the molding compound, shrinkage on cooling, or the like, the plunger member 22 can spontaneously expand once again to release more molding compound into mold cavity 12 and then spontaneously reclose.

The specific pressure-responsive action of plunger member 22 will be a function of its geometry, specifically of the relative areas of surfaces 44 and 46, which can be specifically adapted to provide the desired pressure responsive action.

The limit of contraction of the plunger member 22 may be defined by the length of rod 30. Rod 30 is preferably of a length that it impinges against end closure 26 as shown in FIG. 2 when the enlarged sealing end 32, 34 is in its first, sealing position. Thus plunger member 22 cannot contract farther inwardly to a degree where the mold gate would reopen.

Annular sleeve or nut 40, secured to rod 30, limits the degree of expansion of the plunger member by impingement against convolution 36 when the plunger member has expanded to its maximum desired amount. Thus the range of longitudinal movement of the plunger member of this invention can be precisely controlled.

Figure 4:
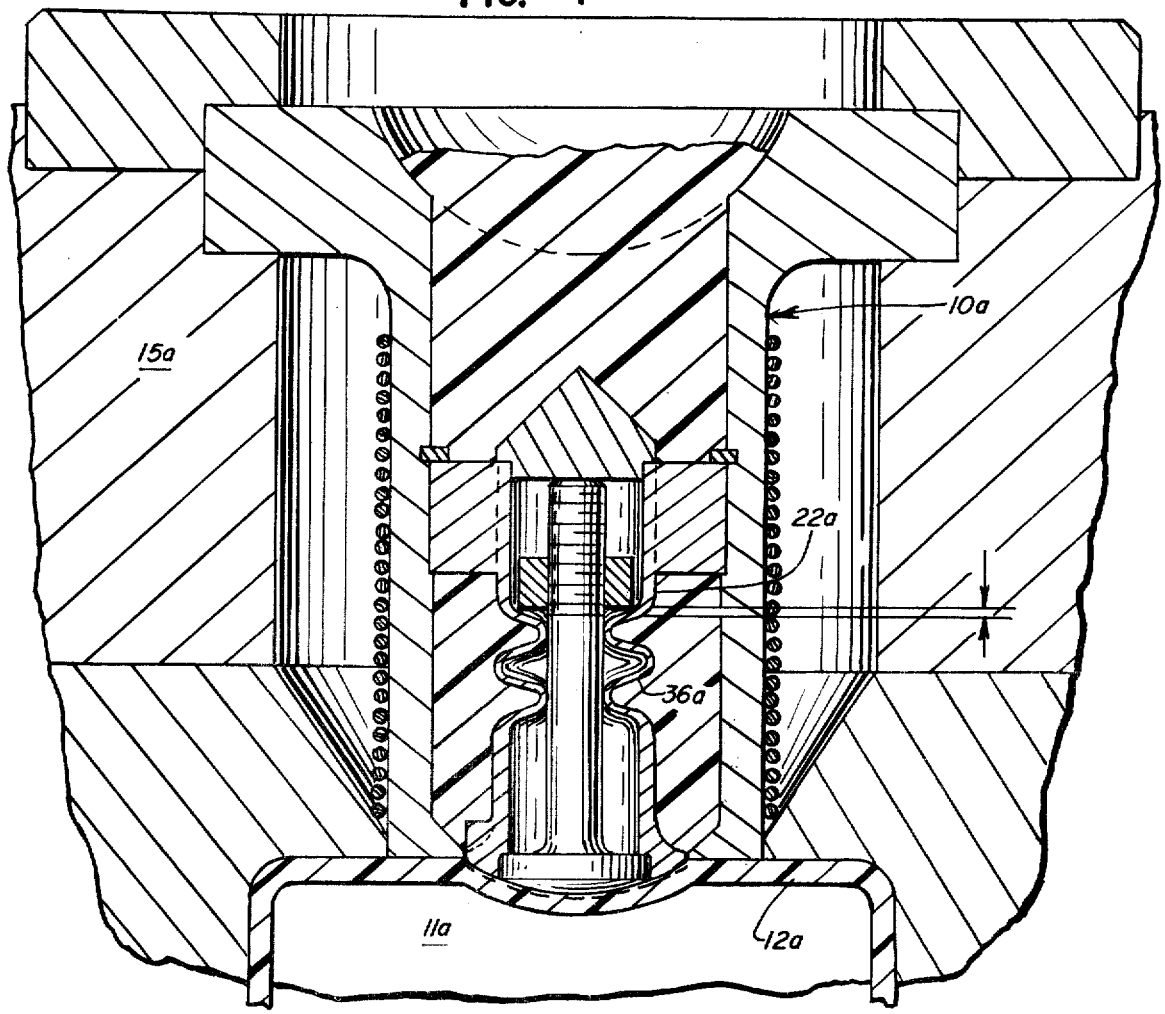
FIG. 4 is a longitudinal sectional view of another embodiment of the mold gate of this invention.

Referring to FIG. 4, another design of the mold gate of this invention is disclosed of substantially identical design to the previous embodiment, with the exception that multiple convolutions 36a are present for greater expansibility and contractibility of plunger member 22a. As in the previous embodiment plunger member 22a is secured in mold gate 10a which, in turn, is carried in outer mold half 15a defining, in combination with mold core 11a, a mold cavity 12a. The mode of operation of the modified valve of this invention remains essentially the same as that of the previous embodiment.

The above has been offered for illustrative purposes only, and is not intended to limit the scope of the invention of this application, which is as defined in the claims below.

That which is claimed is:

1. A gate for a mold which comprises a molding compound inlet conduit defining an outer end for communication with a source of molding compound and an inner end for communication with the mold cavity, and a plunger member mounted in said molding compound inlet conduit and adapted to prevent flow through said conduit in a first longitudinal position and to permit flow through said conduit in second longitudinal positions, said plunger defining a transversely enlarged sealing end proportioned to prevent said flow through the conduit in the first position, said transversely enlarged sealing end defining a mold cavity-facing surface which is of larger cross sectional area than the surface of the plunger opposed to said mold cavity and subject to contact with pressurized molding compound in the conduit, said plunger member comprising a sealed metal tubular wall, at least a portion of said tubular wall defining annular convolution means to provide a longitudinally expansible and contractible characteristic to said plunger member, said tubular wall being immovably secured adjacent one end thereof, whereby pressurized molding compound in the conduit, relative to pressure in the mold cavity, causes said enlarged sealing end to longitudinally expand to spontaneously advance into a second longitudinal position by the action of pressure on said opposed surface to open said gate, and relative equalization of elevated pressures in the mold cavity and the conduit causes said enlarged sealing end to longitudinally contract to spontaneously close to its first longitudinal position.

2. The mold gate of claim 1 in which said annular convolution means in the tubular wall is of relatively reduced wall thickness.

3. The mold gate of claim 1 in which said plunger member is secured within said molding compound inlet conduit by radial members secured between the plunger member and the inner surface of said inlet conduit, said radial members being attached to the plunger member at a position remote from the transversely enlarged sealing end.

4. The mold gate of claim 1 in which said plunger member carries within the tubular wall means for limiting the longitudinal contraction thereof to a predetermined minimum length.

5. The mold gate of claim 4 in which said limiting means includes a rod member carried by said transversely enlarged sealing end within said tubular wall, the end of said tubular wall opposed to said enlarged sealing end being closed, whereby the contraction of said plunger member is limited by the impingement of the rod member against the opposed end.

6. The mold gate of claim 1, in which said plunger means defines annular convolution means to provide the longitudinally expansible and contractible characteristic of the plunger member, projection means carried on the rod member at a distance farther from said transversely enlarged sealing end than the convolution means and proportioned to impinge the convolution means at a predetermined plunger expansion distance, to limit the amount of plunger expansion, said plunger means being immovably secured adjacent its outer end.

7. The mold gate of claim 6 in which said projection means is a nut threadedly carried by said rod member.

8. A gate for a mold which comprises, a molding compound inlet conduit defining an outer end in communication with a source of molding compound and an inner end for communication with the mold cavity, and a plunger member mounted in said molding compound inlet conduit and adapted to prevent flow through said conduit in a first longitudinal position, and to permit flow through said conduit in second longitudinal positions, said plunger defining a transversely enlarged sealing end proportioned to prevent said flow through the conduit in the first position, said sealing end defining a mold cavity-facing surface which is of larger cross-sectional area than the surface of the plunger opposed to said mold chamber and subject to contact with pressurized molding compound in the conduit, said plunger member being longitudinally expansible and contractible, and being secured within the molding compound inlet conduit by members attached to said plunger member at a position remote from the transversely enlarged sealing end, said plunger member comprising a tubular metal wall, at least a portion of said tubular wall defining annular convolution means to provide the longitudinally expansible and contractible characteristic of the plunger member.

9. The mold gate of claim 8 in which said plunger member carries within the tubular wall means for limiting the longitudinal contraction thereof to a predetermined minimum length.

10. The mold gate of claim 9 in which said limiting means includes a rod member carried by said transversely enlarged sealing end within said tubular wall, the end of said tubular wall opposed to said enlarged sealing end being closed, whereby the contraction of said plunger member is limited by the impingement of the rod member against the opposed end.

11. The mold gate of claim 10 in which projection means are carried on the rod member at a distance farther from said transversely enlarged sealing end than the convolution means and proportioned to impinge the convolution means at a predetermined plunger expansion distance, to limit the amount of plunger expansion.

12. The mold gate of claim 11 in which said annular convolution means in the tubular wall is of relatively reduced wall thickness.

13. The mold gate of claim 12 including radially oriented vanes secure the plunger member to the molding compound inlet conduit, said vanes being spaced apart to permit the flow of molding compound about said plunger member between said vanes.

14. The mold gate of claim 13 in which said transversely enlarged sealing end defines radially mounted rib means on the face of said sealing end which faces away from said mold cavity to strengthen said sealing end and serve as a guide.

15. In a multiple cavity mold system, a plurality of gates each of said mold gates comprising: a molding compound inlet conduit defining an outer end for communication with a source of molding compound and an inner end for communication with the mold cavity, a plunger member mounted in said molding compound inlet conduit and adapted to prevent flow through said conduit in a first longitudinal position, and to permit flow through said conduit in a second longitudinal position, said plunger member defining a transversly enlarged sealing end proportioned to prevent said flow through the conduit in the first position, said sealing end defining a mold cavity-facing surface which is of larger cross-sectional area than the surface of the plunger opposed to said mold chamber and subject to contact with pressurized molding compound in the conduit, said plunger member comprising a sealed tubular metal wall, at least a portion of said tubular wall defining annular convolution means to provide a longitudinally expansible and contractible characteristic to the plunger member, said tubular wall being immovably secured adjacent one end thereof whereby relatively pressurized molding compound in the conduit, relative to pressure in the mold cavity, causes said enlarged sealing end to longitudinally expand to spontaneously open into a second longitudinal position by the action of pressure on said opposed surface, the relative equalization of elevated pressures in the mold cavity and the conduit causing said enlarged sealing end to longitudinally contract to spontaneously close to its first longitudinal position.

* * * * *